(12) United States Patent
Döring et al.

(10) Patent No.: US 10,100,755 B2
(45) Date of Patent: Oct. 16, 2018

(54) METHOD AND CONTROL DEVICE FOR OPERATING A SYSTEM CONSISTING OF A PLURALITY OF INTERNAL COMBUSTION ENGINES

(71) Applicant: MAN DIESEL & TURBO SE, Augsburg (DE)

(72) Inventors: Andreas Döring, München/Unterhaching (DE); Alexander Knafl, Augsburg (DE); Mirko Bugsch, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 56 days.

(21) Appl. No.: 15/515,382

(22) PCT Filed: Sep. 30, 2015

(86) PCT No.: PCT/EP2015/072627
§ 371 (c)(1),
(2) Date: Mar. 29, 2017

(87) PCT Pub. No.: WO2016/050881
PCT Pub. Date: Apr. 7, 2016

(65) Prior Publication Data
US 2017/0218857 A1     Aug. 3, 2017

(30) Foreign Application Priority Data
Oct. 1, 2014 (DE) .................. 10 2014 014 636

(51) Int. Cl.
*F01N 3/00*     (2006.01)
*F02D 25/04*    (2006.01)
(Continued)

(52) U.S. Cl.
CPC ......... *F02D 25/04* (2013.01); *F02D 41/0082* (2013.01); *F02D 41/027* (2013.01);
(Continued)

(58) Field of Classification Search
USPC ......... 60/172, 274, 280, 285, 286, 295, 297, 60/301, 303, 311; 123/51 BC, 52.1, 52.2,
(Continued)

(56) References Cited

U.S. PATENT DOCUMENTS 5,964,088 A * 10/1999 Kinugasa ........... B01D 53/9431
                                                      60/285
6,345,496 B1 * 2/2002 Fuwa ................. B01D 53/8696
                                                      60/274
(Continued)

FOREIGN PATENT DOCUMENTS

CA        2437069       2/2004
DE        100 18 062    10/2001
(Continued)

OTHER PUBLICATIONS

Office Action dated Feb. 19, 2018 which issued in the corresponding Japanese Patent Application No. 2017-513528.

*Primary Examiner* — Binh Q Tran
(74) *Attorney, Agent, or Firm* — Cozen O'Connor

(57) ABSTRACT

A method for operating a system having a plurality of internal combustion engines coupled together such that then outputs are drawn off by a common load, a downstream individual exhaust gas aftertreatment device, in which the exhaust gas of a particular engine undergoes an individual exhaust gas aftertreatment, positioned downstream of each engine, or a common exhaust gas aftertreatment device, in which the exhaust gas undergoes a common exhaust gas aftertreatment, positioned downstream of to the engine. To regenerate an exhaust gas aftertreatment device, the drive
(Continued)

output of one engine is reduced, the temperature of the exhaust gas is increased, and the drive output of a second engine is increased such that the drive output reduction is at least partially compensated for.

12 Claims, 2 Drawing Sheets

(51) Int. Cl.
 *F02D 41/02* (2006.01)
 *F02D 41/00* (2006.01)
 *F02D 25/00* (2006.01)
(52) U.S. Cl.
 CPC .......... *F02D 41/0245* (2013.01); *F02D 25/00* (2013.01); *F02D 41/02* (2013.01); *F02D 2250/18* (2013.01); *Y02T 10/26* (2013.01)
(58) Field of Classification Search
 USPC .............................. 123/52.4, 52.6, 59.6, 315
 See application file for complete search history.

(56) References Cited

U.S. PATENT DOCUMENTS

| | | | | |
|---|---|---|---|---|
| 6,986,342 | B2 * | 1/2006 | Thomas | F01B 3/04 123/536 |
| 8,880,248 | B2 * | 11/2014 | Frazier | B61C 3/00 701/19 |
| 9,644,528 | B2 * | 5/2017 | Bandyopadhyay | F02B 29/0412 |
| 2004/0112042 | A1 | 6/2004 | Hoffmann et al. | |
| 2007/0204594 | A1 | 9/2007 | Ishii | |
| 2013/0046424 | A1 | 2/2013 | Gallagher et al. | |

FOREIGN PATENT DOCUMENTS

| | | |
|---|---|---|
| DE | 101 01 593 | 7/2002 |
| DE | 10238771 | 3/2004 |
| EP | 1 270 915 | 1/2003 |
| EP | 2 267 291 | 12/2010 |
| JP | 2004-084665 | 3/2004 |
| JP | 2007-230475 | 9/2007 |
| WO | WO 2010/092855 | 8/2010 |

* cited by examiner

METHOD AND CONTROL DEVICE FOR OPERATING A SYSTEM CONSISTING OF A PLURALITY OF INTERNAL COMBUSTION ENGINES

CROSS REFERENCE TO RELATED APPLICATION

This is a U.S. national stage of application No. PCT/EP2015/072627, filed on Sep. 30, 2015. Priority is claimed on German Application No. DE102014014636.7, filed Oct. 1, 2014, the content of which is incorporated here by reference.

BACKGROUND OF THE INVENTION

1. Field of the Invention

The invention relates to a method for operating a system consisting of a plurality of internal combustion engines and a control device for carrying out the method.

2. Description of the Prior Art

From practice, systems consisting of a plurality of internal combustion engines are known, which are coupled in such a manner that drive outputs provided by the internal combustion engines are drawn by at least one common consumer. In sum total, the drive outputs provided by the internal combustion engines of the system in this case provide a total output drawn by the at least one or each common consumer.

From practice it is known, furthermore that either each internal combustion engine of such a system of internal combustion engines is assigned an individual exhaust gas aftertreatment device or multiple internal combustion engines of such a system of internal combustion engines are assigned a common exhaust gas aftertreatment device. In particular when an individual exhaust gas aftertreatment is arranged downstream of internal combustion engines, the exhaust gas of each respective internal combustion engine is subjected to an individual exhaust gas aftertreatment in the respective exhaust gas aftertreatment device. When a common exhaust gas aftertreatment device is arranged downstream of a plurality of internal combustion engines the exhaust gas of this plurality of internal combustion engines is combined for the common exhaust gas aftertreatment and then conducted via the common exhaust gas aftertreatment device.

Such an exhaust gas aftertreatment device can for example be an SCR catalytic converter, in which nitrogen oxides are converted into nitrogen and water vapour using a reduction agent such as ammonia. An NO oxidation catalytic converter can be connected upstream of such an SCR catalytic converter, to convert NO into $NO_2$ upstream of the SCR catalytic converter and thereby increase the speed of reaction in the SCR catalytic converter. Additionally or alternatively, an exhaust gas aftertreatment device can also comprise a $CH_4$ oxidation catalytic converter to reduce for example $CH_4$ emissions, which are incurred in particular in the case of gas engines.

During operation there is the problem that exhaust gas aftertreatment devices are subjected to coking-up with hydrocarbons and/or with fuel-generated and engine oil-generated sulphates and sulphides in particular when operating temperatures of the exhaust gas aftertreatment devices are too low over an extended period of time, as a result of which the respective exhaust gas aftertreatment device is deactivated or loses its effectiveness. Such a deactivation is reversible and can be reversed by raising the exhaust gas temperature in terms of a regeneration of the respective exhaust gas aftertreatment device, as a result of which the respective exhaust gas aftertreatment device regains its original activity.

During the operation of a system consisting of a plurality of internal combustion engines, downstream of which individual exhaust gas aftertreatment devices are arranged, or downstream of which a common exhaust gas aftertreatment device is arranged, the regeneration of the respective exhaust gas aftertreatment device causes difficulties. The reason for this among others is that for effective regeneration of an exhaust gas aftertreatment device the drive output of at least one internal combustion engine of the system of a plurality of internal combustion engines has to be reduced. However this is not possible in particular when the internal combustion engines each provide drive outputs for at least one common consumer, since the drive power that is then available to the common consumer would be reduced and the same could no longer be fully operated.

SUMMARY OF THE INVENTION

One aspect of the present invention is a new method for operating a system consisting of a plurality of internal combustion engines and a control device for carrying out the method.

For regenerating the exhaust gas aftertreatment device according to one aspect of the invention, the drive output of at least one internal combustion engine is reduced, the temperature of the exhaust gas of the or each first internal combustion engine increased, and furthermore the drive output of at least one second internal combustion engine increased such manner that the reduction of the drive output on the or each first internal combustion engine is at least partially offset.

With the present invention it is proposed that in particular when an exhaust gas aftertreatment device of a system having a plurality of coupled internal combustion engines is to be regenerated, the drive output of at least one first internal combustion engine is reduced. Furthermore, the temperature of the exhaust gas of the one or each first internal combustion engine the drive output of which is reduced, is increased.

Furthermore, the drive output of at least one second internal combustion engine is increased to at least partially offset the reduction of the drive output of the one or each first internal combustion engine. Because of this it is possible despite the reduction of the drive output on at least one first internal combustion engine to keep the total drive output provided for the respective common consumer of the system of coupled internal combustion engines constant. Through the reduction of the drive output of the or each first internal combustion engine the exhaust gas temperature of the exhaust gas of the respective first internal combustion engine can be increased, in particular by way of an intervention on the respective first internal combustion engine on the motor side, without there being the risk that critical component temperatures on the respective first internal combustion engine are exceeded.

Alternatively or additionally, the exhaust gas temperature of the one or each first internal combustion engine, the drive output of which is reduced, can also be increased by an external heat source. There is the advantage that as a consequence of the reduced drive output on the respective first internal combustion engine a lower exhaust gas quantity is incurred, so that for increasing the exhaust gas temperature a relatively small external heat source is sufficient, which also requires only relatively little energy. Because of this, the fuel requirement can be reduced.

In particular when an individual exhaust gas aftertreatment device is arranged downstream of each internal combustion engine, the drive output of the respective first internal combustion engine is reduced for regenerating the exhaust gas aftertreatment device of at least one first internal combustion engine and furthermore the drive output of at least one second internal combustion engine, the exhaust gas aftertreatment device of which is not being regenerated, is increased in such a manner that the reduction of the drive output on the one or each first internal combustion engine is offset. In the process, the temperature of the exhaust gas to be conducted via the exhaust gas aftertreatment device of the respective first internal combustion engine to be regenerated is increased in particular through a motor intervention on the respective first internal combustion engine, wherein the drive output of the one or each second internal combustion engine is increased in such a manner that a total drive output provided by the first and second internal combustion engine remains constant in sum total. This configuration of the method is advantageous in particular when an individual exhaust gas aftertreatment device is arranged downstream of each internal combustion engine.

In particular when a common exhaust gas aftertreatment device is arranged downstream of a plurality of internal combustion engines, the drive output of at least one first internal combustion engine is reduced for regenerating an exhaust gas aftertreatment device, and furthermore the drive output of at least one second internal combustion engine, the exhaust gas of which is conducted via the same exhaust gas aftertreatment device, is increased in such a manner that the reduction of the drive output on the or each first internal combustion engine is offset. In the process, the temperature of the exhaust gas of the one or each first internal combustion engine, the drive output of which is being reduced, is increased in particular by way of a motor intervention on the respective first internal combustion engine and in addition to this the drive output of at least one second internal combustion engine is increased in such a manner that the reduction of the drive output on the or each first internal combustion engine is offset in such a manner that a total drive output provided by the first and second internal combustion engines remains constant in sum total. This configuration of the method is advantageous in particular when a common exhaust gas aftertreatment device is arranged downstream of a plurality of internal combustion engines.

Preferentially, the temperature of the exhaust gas of the respective first internal combustion engine, the drive output of which is being reduced, is increased by changing a fuel-air ratio and/or by changing a start of injection and/or by changing an injection pressure and/or by changing a compression ratio and/or by changing valve opening times and/or by changing a charge air temperature and/or by changing an exhaust gas backpressure. Alternatively or additionally, the temperature of the exhaust gas of the respective first internal combustion engine the drive output of which is being reduced, is increased by an external heat source. Because of this, the temperature of the exhaust gas on the respective first internal combustion engine, the drive output of which is being reduced, can be particularly advantageously increased.

The control device according to one aspect of the invention comprises elements for carrying out the method according to the invention.

BRIEF DESCRIPTION OF THE DRAWINGS

Preferred further developments of the invention are obtained from the subclaims and the following description. Exemplary embodiments of the invention are explained in more detail by way of the drawings without being restricted to this. They show:

DETAILED DESCRIPTION OF THE PRESENTLY PREFERRED EMBODIMENTS

The invention relates to a method for operating a system consisting of a plurality of internal combustion engines and to a control device for carrying out the method.

Figure 1:
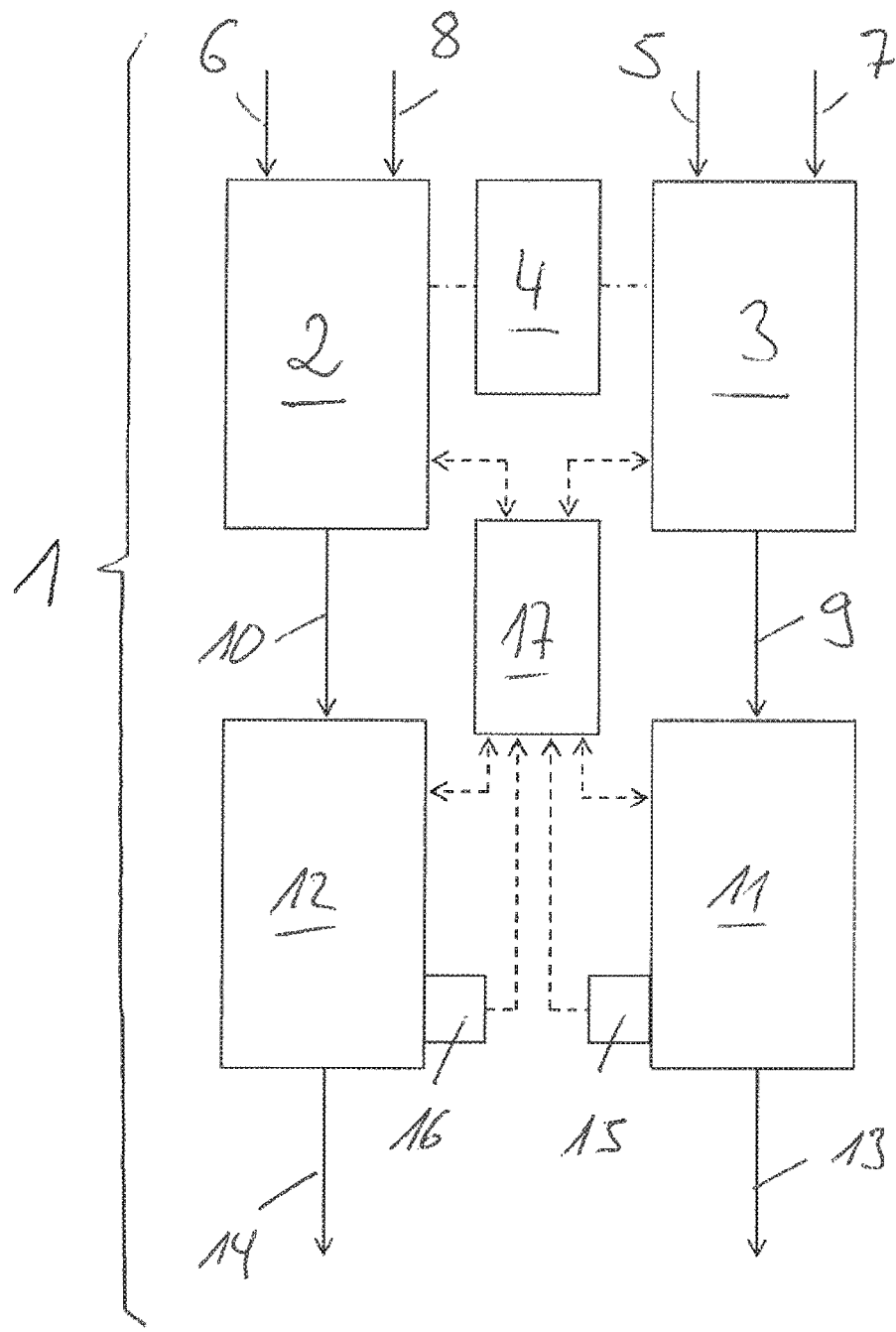
FIG. 1 is a block diagram of a first system having of a plurality of internal combustion engines.

FIG. 1 shows highly schematically a first system 1 having of a plurality of internal combustion engines 2, 3. The internal combustion engines 2, 3 shown in FIG. 1 are coupled to one another in such a manner that drive outputs provided by the same are drawn by a common consumer 4. This consumer 4 can for example be a hydraulic, electrical, mechanical, or other consumer, the required drive output of which is provided by both internal combustion engines 2 and 3 in sum total. Both internal combustion engines 2 and 3 accordingly provide part drive outputs for the common consumer 4.

According to FIG. 1, each of the internal combustion engines is supplied on the one hand with fuel 5 and 6 respectively and on the other hand combustion air 7, 8, wherein in the respective internal combustion engine 2, 3 the fuel 5, 6 is combusted and exhaust gas 9, 10 discharged from the respective internal combustion engine 2, 3.

In the case of the system 1 of FIG. 1, each internal combustion engine 2, 3 is assigned an individual exhaust gas aftertreatment device 11, 12, in which the respective exhaust gas 9, 10 of the respective internal combustion engine 2, 3 is subjected to an individual exhaust gas aftertreatment. Accordingly, cleaned exhaust gas 13, 14 leaves the exhaust gas aftertreatment device 11, 12.

If for example the exhaust gas aftertreatment device 12, which is connected downstream of the internal combustion engine 2, is to be regenerated for example, the drive output of the internal combustion engine 2, the temperature of the exhaust gas 10 of this internal combustion engine 2 reduced in drive output and furthermore the drive output of the internal combustion engine 3, the exhaust gas aftertreatment device 11 of which is not regenerated, is increased for regenerating this exhaust gas aftertreatment device 12 according to the invention, namely in such a manner that the reduction of the drive output on the internal combustion engine 2 is at least partially, preferentially completely offset in order to thus provide a constant total drive output for the common consumer 4 in sum total.

For regenerating one of the exhaust gas aftertreatment devices of the system of FIG. 1, the drive output on a first internal combustion engine, which is located upstream of the exhaust gas aftertreatment device to be regenerated, is accordingly reduced. On a second internal combustion engine, the exhaust gas aftertreatment device of which is not being regenerated, the drive output is increased in order to offset the reduced drive output of the first internal combustion engine. Furthermore, the temperature of the exhaust gas of the particular first internal combustion engine the drive power of which was reduced, is increased in order to regenerate the exhaust gas aftertreatment device connected downstream of this first internal combustion engine as a consequence of increased exhaust gas temperature. In the process, the total drive output provided by the internal combustion engines remains constant so that despite the reduction of the drive output on the first internal combustion engine as a consequence of the increase of the drive output of the second internal combustion engine the common consumer can be fully operated now as before.

Increasing the exhaust gas temperature of the exhaust gas of that particular first internal combustion engine, the drive output of which is being reduced, preferentially is effected by an intervention on the motor side on the respective first internal combustion engine reduced in drive output.

Such an intervention on the motor side can be effected for example by changing a fuel-air ratio and/or by changing a start of injection and/or by changing an injection pressure and/or by changing a compression ratio and/or by changing valve opening times and/or by changing a charge air temperature and/or by changing an exhaust gas back pressure on the respective internal combustion engine reduced in drive output.

According to an advantageous further development it is provided that at least one sensor 15, 16 is assigned to each exhaust gas aftertreatment device 11, 12 of the system 1 of FIG. 1, with the help of which it can be automatically detected if a regeneration is required for the respective exhaust gas aftertreatment device 11, 12. This can be effected for example via a NOx sensor or NH₃ sensor or a soot sensor.

The measurement signal provided by the sensors 15, 16 is provided to a control device 17 which, in particular when the same detects that a regeneration is required on one of the exhaust gas aftertreatment devices 11, 12 automatically carries out the above method in that on the particular internal combustion engine, which is located upstream of the exhaust gas aftertreatment device to be regenerated, the drive output is reduced, the exhaust gas temperature of said internal combustion engine is increased and furthermore the drive output of the other internal combustion engine, the exhaust gas aftertreatment device of which is not to be regenerated, is increased in order to offset the reduction of the drive output on the other internal combustion engine.

The control device 17 comprises elements for carrying out the method according to the invention including hardware and software.

The hardware of the control device 17 are data interfaces in order to exchange data with the assemblies involved in carrying out the method according to the invention. Furthermore, the hardware of the control device 17 is a processor for data processing and a storage unit for storing data. The software of the control device 17 are program modules that serve for carrying out the method according to the invention.

Although not shown in FIG. 1, it is possible, alternatively or additionally to the intervention on the respective internal combustion engine on the motor side, to increase an exhaust gas temperature for the exhaust gas of an internal combustion engine reduced in its drive output also via an external heat source. Because of the reduction of the drive output of the respective internal combustion engine, a lower exhaust gas quantity is incurred on the same so that the exhaust gas of the internal combustion engine reduced in drive output can be increased via a relatively small external heat source, which requires relatively little energy, to a temperature that is required for regenerating the respective exhaust gas aftertreatment device.

Figure 2:
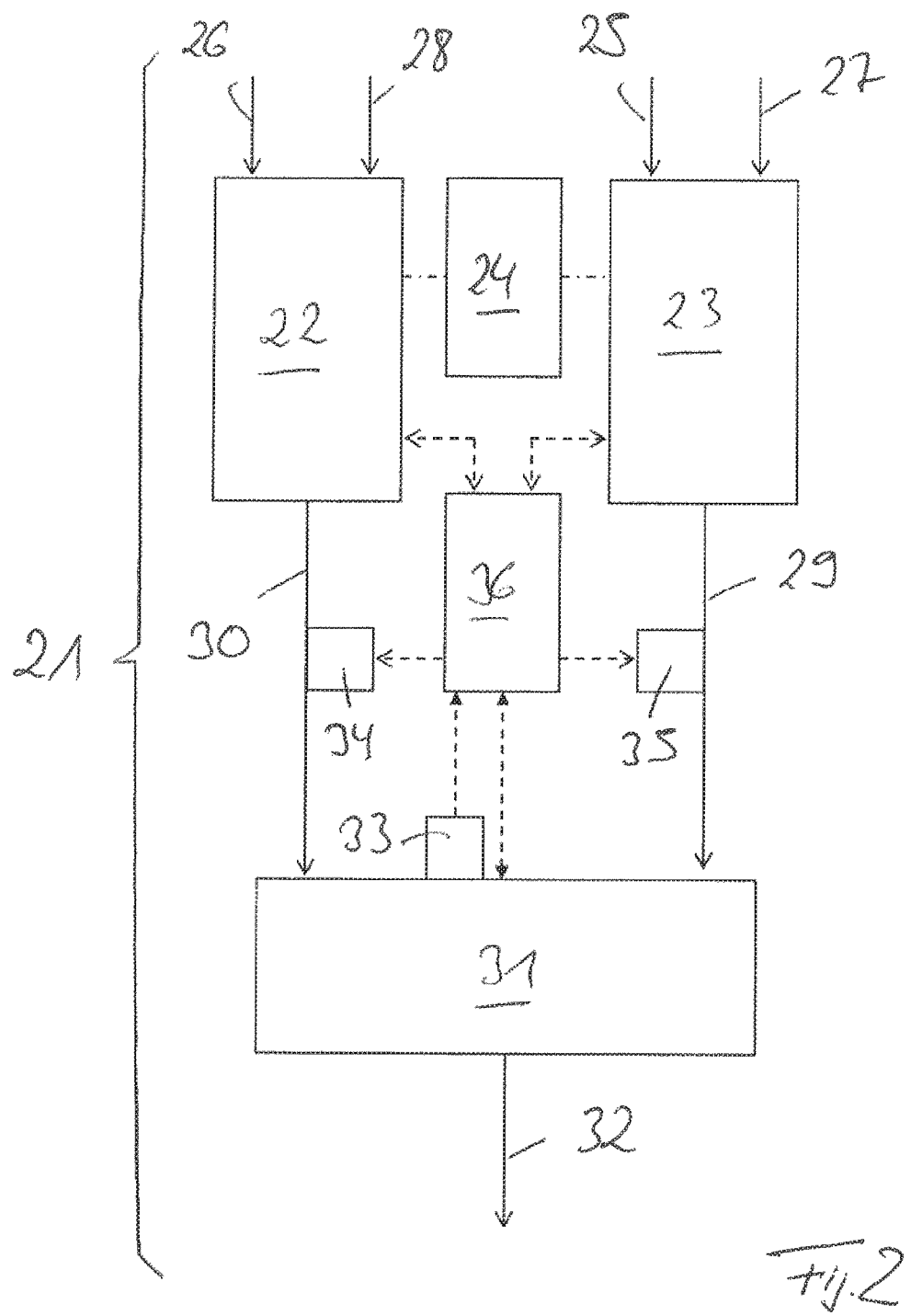
FIG. 2 is a block diagram of a second system having of a plurality of internal combustion engines.

FIG. 2 shows an alternative system 21 having of a plurality of coupled internal combustion engines 22, 23, the drive output in turn is drawn by a common consumer 24. In the internal combustion engines 22 and 23, fuel 25 and 26 respectively is also combusted in the presence of charge air 27 and 28 respectively generating corresponding exhaust gases 29 and 30 respectively. In contrast with the system 1 of FIG. 1, the exhaust gas 29, 30 of the two internal combustion engines 22, 23 with the system 21 of FIG. 2, is conducted via a common exhaust gas aftertreatment device 31 and subjected to a common exhaust gas aftertreatment. The exhaust gas 29, 30 of both internal combustion engines 22, 23 in FIG. 2 is accordingly conducted via the common exhaust gas aftertreatment device 31, cleaned exhaust gas 32 leaving the same.

In particular when the exhaust gas aftertreatment device 31 is to be regenerated, which can be detected for example via a sensor 33 assigned to the exhaust gas aftertreatment device 31, the drive output of a first internal combustion engine of the system 21 is reduced, the temperature of the exhaust gas of this first internal combustion engine of this first internal combustion engine the drive output of which is reduced, increased and the drive output of the other, second internal combustion engine increased, in order to offset the reduction of the drive output of the other internal combustion engine.

Accordingly, the drive output of the internal combustion engine 22 can be reduced for example in FIG. 2, the temperature of the exhaust gas 30 of this internal combustion engine 22 increased and the drive output of the other internal combustion engine 23 increased so that the two internal combustion engines 22 and 23 provide a constant total drive output for the common consumer 24 in sum total.

Increasing the exhaust gas temperature of the exhaust gas 30 on the internal combustion engine 22 reduced in its drive output can be again effected in accordance with the exemplary embodiment of FIG. 1 via at least one of the abovementioned interventions on the motor side and/or an external heat source. In FIG. 2, such an external heat source 34 and 35 respectively is positioned downstream of each internal combustion engine 22, 23, via which the exhaust gas 29 and 30 respectively of the respective internal combustion engine can be heated.

In the exemplary embodiment of FIG. 2, in which the exhaust gas of the each internal combustion engines 22, 23 is conducted via a common exhaust gas aftertreatment device 31, it can be provided that the regeneration of the same takes place by sections or by portions, in that for example the exhaust gas of the internal combustion engine 22 reduced with respect to the output increased with respect to its temperature is conducted via a first section of the exhaust gas aftertreatment device 31 and the exhaust gas of the internal combustion engine 23 increased with respect to its drive output via a second section of the exhaust gas aftertreatment device 31.

It can likewise be provided to mix the exhaust gases of both internal combustion engines 22 and 23 in advance and subsequently conduct the mixture exclusively via a section of the exhaust gas aftertreatment device.

By generating the exhaust gas aftertreatment device 31 by sections, the regeneration of the same can be improved, for the purpose of which however it is required that individual sections of the exhaust gas aftertreatment device 31 can be separated or decoupled from one another for regeneration by way of flaps or other shut-off elements.

In FIG. 2, in turn, a control device 36 is shown that serves for carrying out the method according to the invention and comprises elements for carrying out the same.

The exhaust gas aftertreatment devices 11, 12, 31 shown in FIGS. 1 and 2 can comprise SCR catalytic converters with NO oxidation catalytic converters located upstream if appropriate. Furthermore, the exhaust gas aftertreatment devices 11, 12, 31 can also comprise $CH^4$ oxidation catalytic converters and/or $CH^2O$ oxidation catalytic converters and/or NOx storage catalytic converters or the like, which can be regenerated by an increase in temperature.

By way of a concrete numerical example, it is to be assumed for example for the exemplary embodiment of FIG. 1, that both internal combustion engines 2 and 3 provide a drive output of 5 MW for the common consumer 4, so that the same accordingly provide a total drive output of 10 MW in sum total. During normal operation, the temperatures of the exhaust gases 9, 10 each amount to approximately 320° C., the sensors 15, 16 designed as NOx sensors measure a NOx concentration in cleaned exhaust gas 13, 14 of approximately 400 mg/Nm$^3$.

It is to be assumed, furthermore, that for example the sensor 16 determines an increase of the NOx concentration in the cleaned exhaust gas flow 14 to 700 mg/Nm$^3$. Based on this increased NOx concentration the control device 17 then infers that the exhaust gas aftertreatment device 12 has to be regenerated.

To this end, the drive output of the internal combustion engine is automatically reduced, for example to 2 MW, and for offsetting this reduction the drive output on the internal combustion engine 3 increased to 8 MW, so that both internal combustion engines 2, 3 then again provide a total drive output of 10 MW for the common consumer 4. Likewise, the temperature of the exhaust gas 10 leaving the internal combustion engine 2 is increased, for example to 380° C., namely as shown above by at least one intervention on the motor side and/or via at least one external heat source.

The above measures, which are taken for regenerating the respective exhaust gas aftertreatment device, namely the reduction of the drive output of at least one first internal combustion engine, the increase of the temperature of the exhaust gas of the or each first internal combustion engine, and furthermore the increase of the drive output of at least one second internal combustion engine for offsetting the reduction of the drive output on the or each first internal combustion engine can be taken for example for a fixed time span in a time-controlled manner, in order to regenerate the respective exhaust gas aftertreatment device in terms of a time control. Following the expiration of this time span the exhaust gas temperature on the first internal combustion engine which is reduced with respect to its drive power is again lowered, the first internal combustion engine which is reduced with respect to its drive output is increased in its drive output and accordingly the other internal combustion engine reduced in its drive output, so that following the regeneration of the exhaust gas aftertreatment device the two internal combustion engines again provide a constant drive output in sum total.

Alternatively, the above measures, which are taken for regenerating the respective exhaust gas aftertreatment device, namely the reduction of the drive output of at least one first internal combustion engine, the increase of the temperature of the exhaust gas of the or each first internal combustion engine, and for furthermore the increase of the drive power of at least one second internal combustion engine for offsetting the reduction of the drive output on the or each first internal combustion engine, can also be taken time-variably in terms of a closed-loop control, in order to regenerate the respective exhaust gas aftertreatment device dependent on the degree of regeneration or regeneration success. In this case, the regeneration of the respective exhaust gas aftertreatment device is terminated in particular when for example dependent on the measurement signal of at least one sensor of the respective exhaust gas aftertreatment device it is determined that no regeneration of the respective exhaust gas aftertreatment device is required any longer.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for regenerating an exhaust gas aftertreatment device in a system having a plurality of internal combustion engines that are coupled to one another such that drive outputs provided by the internal combustion engines are drawn by at least one common consumer and one of a respective exhaust gas aftertreatment device arranged downstream of each internal combustion engine in which an exhaust gas of each respective internal combustion engine is subjected to an exhaust gas aftertreatment device comprising one of an individual exhaust gas aftertreatment device is and a common exhaust gas aftertreatment device arranged downstream of the plurality of internal combustion engines in which the exhaust gas of each internal combustion engines is subjected to a common exhaust gas aftertreatment, the method for regenerating the exhaust gas aftertreatment device comprising:

reducing a drive output of at least one first internal combustion engine;

increasing a temperature of the exhaust gas of the one or each first internal combustion engine; and increasing a drive output of at least one second internal combustion engine to at least partially offset a reduction of the drive output of the one or each first internal combustion engine.

2. The method according to claim 1, wherein the exhaust gas aftertreatment device comprises the individual exhaust gas aftertreatment device and wherein a drive output of a respective first internal combustion engine is reduced and a drive output of at least one second internal combustion engine, the exhaust gas aftertreatment device of which is not regenerated, is increased such that the reduction of the drive output of the one or each first internal combustion engine is offset.

3. The method according to claim 2, wherein for regenerating the exhaust gas aftertreatment device of the respective first internal combustion engine the drive output of the respective first internal combustion engine is reduced and the temperature of the exhaust gas to be conducted via the exhaust gas aftertreatment device of the respective first internal combustion engine to be regenerated is increased and in that the drive output of the one or each second internal combustion engine is increased such that a total drive output provided by the first and second internal combustion engines remains constant.

4. The method according to claim 1,
wherein the exhaust gas aftertreatment device comprises a common exhaust gas aftertreatment device arranged downstream of the plurality of internal combustion engines, and
wherein the drive output of at least one first internal combustion engine is reduced and the drive output of at least one second internal combustion engine, the exhaust gas of which is conducted via the same exhaust gas aftertreatment device is increased such that the reduction of the drive output on the or each first internal combustion engine is offset.

5. The method according to claim 4, further comprising increasing the temperature of the exhaust gas of the one or each first internal combustion engine, the drive output of which is reduced, and
increasing the drive output of at least one second internal combustion engine such that the reduction of the drive output on the one or each first internal combustion engine is offset such that a total drive output provided by the first and second internal combustion engines remains constant.

6. The method according to claim 5, wherein the exhaust gas aftertreatment device to be regenerated is only flowed through by the exhaust gas by segments.

7. The method according to claim 1, further comprising:
monitoring at least one sensor to determine if a regeneration of an exhaust gas aftertreatment device is required; and
regeneration of this exhaust gas aftertreatment device is carried out automatically when it is determined that regeneration of an exhaust gas aftertreatment device is required.

8. The method according to claim 1, wherein the regeneration of the respective exhaust gas aftertreatment device is carried out in one of a closed-loop controlled manner and a time-controlled manner.

9. The method according to claim 1, wherein the temperature of the exhaust gas of the or each first internal combustion engine, the drive output of which is being reduced, is increased by a motor intervention on the respective first internal combustion engine.

10. The method according to claim 9, wherein the temperature of the exhaust gas of the respective first internal combustion engine is increased by at least one of:
changing a fuel-air ratio,
changing a start of injection,
changing an injection pressure,
changing a compression ratio,
changing valve opening times,
changing a charge air temperature, and
changing an exhaust gas backpressure.

11. The method according to claim 1, wherein the temperature of the exhaust gas of the respective first internal combustion engine is increased by an external heat source.

12. A control device, for operating a system having a plurality of internal combustion engines that are coupled to one another such that drive outputs provided by the internal combustion engines are drawn by at least one common consumer and one of a respective exhaust gas aftertreatment device arranged downstream of each internal combustion engine in which the exhaust gas of each respective internal combustion engine is subjected to an exhaust gas aftertreatment device comprising one of an individual exhaust gas aftertreatment device is and a common exhaust gas aftertreatment device arranged downstream of the plurality of internal combustion engines in which the exhaust gas of each internal combustion engines is subjected to a common exhaust gas aftertreatment, the control device for regenerating the exhaust gas aftertreatment device configured to:
reduce a drive output of at least one first internal combustion engine;
increase a temperature of the exhaust gas of the one or each first internal combustion engine; and
increase a drive output of at least one second internal combustion engine to at least partially offset a reduction of the drive output of the one or each first internal combustion engine.

* * * * *